UNITED STATES PATENT OFFICE.

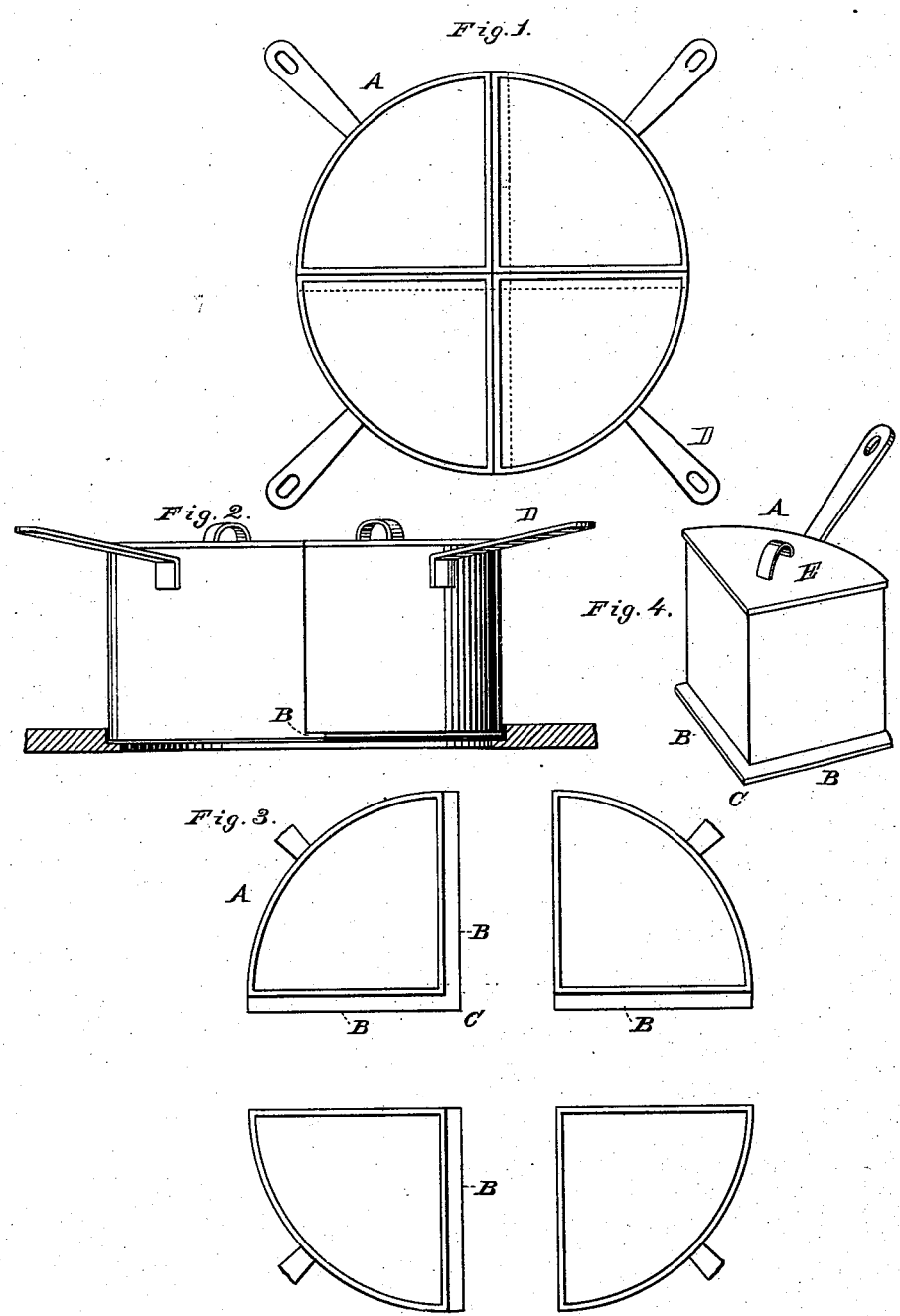

GEORGE HENRY EYMER, OF RED OAK, IOWA.

COOKING UTENSIL.

SPECIFICATION forming part of Letters Patent No. 377,712, dated February 7, 1888.

Application filed July 30, 1887. Serial No. 245,729. (No model.)

*To all whom it may concern:*

Be it known that I, GEORGE HENRY EYMER, a citizen of the United States, residing at Red Oak, in the county of Montgomery and State of Iowa, have invented certain new and useful Improvements in Cooking Utensils; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and shows a top view of the pots or pans without the covers. Fig. 2 is a side view. Fig. 3 is a top view showing the pots separated. The handles are broken off. Fig. 4 is a perspective view of a pot with the double flange.

This invention has relation to cooking utensils; and it consists in the construction and novel combination of parts, as hereinafter set forth.

In the accompanying drawings, A A designate the sector-shaped sectional pots or pans, which, when placed together with their radial walls in contact around a common angular center, form a circle of pots or pans which may be located over the pot-hole of a stove, so that each of the sectional pots shall receive its portion of the heat.

In order to prevent the blaze from coming up through the stove-hole between the sectional pots, they are provided with lateral flanges projecting from their bases. The pot A is usually provided with a double flange, B B, projecting from its base on each side, said double flange extending in front or beyond the angle, as at C, to protect the center of the arrangement of pots when in position. The other sectional pots have single flanges B on one side, which are sufficient to receive the edge of the bottoms of the adjacent pots, and one of the pots is made without flange. Each pot is usually provided with a handle, D, extending from the upper portion of its circular wall and with an independent cover, E.

In order that the covers may be readily applied when the sectional pots are in grouped position, they should have little or no flange on their angular edges.

Having described this invention, what I claim, and desire to secure by Letters Patent, is—

In a group of sector-shaped pots, the combination of the pot having the integral double base-flange extending to the point C, the pots having the single integral base-flange and the pot without flanges, all designed, when placed together, to bring the radial walls in close contact, substantially as specified.

In testimony whereof I affix my signature in presence of two witnesses.

GEORGE HENRY EYMER.

Witnesses:
 P. P. CLARK,
 W. MELTER.